(12) United States Patent
Ono et al.

(10) Patent No.: US 9,699,421 B2
(45) Date of Patent: Jul. 4, 2017

(54) MOTORCYCLE HAVING A VIDEO CAMERA MOUNTED THEREON FOR MONITORING A ROAD SURFACE, AND METHODS OF USING SAME

(71) Applicant: HONDA MOTOR CO., LTD., Minato-ku, Tokyo (JP)

(72) Inventors: Tetsuya Ono, Wako (JP); Masatsugu Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 14/156,562

(22) Filed: Jan. 16, 2014

(65) Prior Publication Data
US 2014/0211008 A1    Jul. 31, 2014

(30) Foreign Application Priority Data

Jan. 31, 2013    (JP) ................................ 2013-017645

(51) Int. Cl.
*H04N 7/18* (2006.01)
*B62J 99/00* (2009.01)
*G01P 3/80* (2006.01)

(52) U.S. Cl.
CPC .............. *H04N 7/183* (2013.01); *B62J 99/00* (2013.01); *G01P 3/806* (2013.01); *B62J 2099/0013* (2013.01); *B62K 2207/02* (2013.01)

(58) Field of Classification Search
CPC ......................................................... B60R 1/00
USPC ........................................................... 348/148
See application file for complete search history.

(56) References Cited

U.S. PATENT DOCUMENTS

| | | | |
|---|---|---|---|
| 2004/0143373 A1* | 7/2004 | Ennis ........................ | B60R 1/00 701/1 |
| 2011/0073401 A1* | 3/2011 | Hanawa .................... | B60K 6/40 180/220 |
| 2014/0200780 A1* | 7/2014 | Watanabe ............. | B60T 8/1706 701/68 |

FOREIGN PATENT DOCUMENTS

JP    2007-278951 A    10/2007

* cited by examiner

*Primary Examiner* — Masum Billah
(74) *Attorney, Agent, or Firm* — Carrier Blackman & Associates, P.C.; William D. Blackman; Jingli Wang

(57) ABSTRACT

A motorcycle has a video camera attached thereto in such a manner as to shoot sharp images. A motorcycle includes a camera adapted to shoot a road surface. The camera is arranged below an engine or a swing arm and more rearward than the center of a crankshaft of the engine. The swing arm pivotally supports a rear wheel with a rear edge portion thereof. The camera is fastened to, and supported either by a lower portion of the engine or by a lower portion of a vehicle body frame connected to the engine.

20 Claims, 10 Drawing Sheets

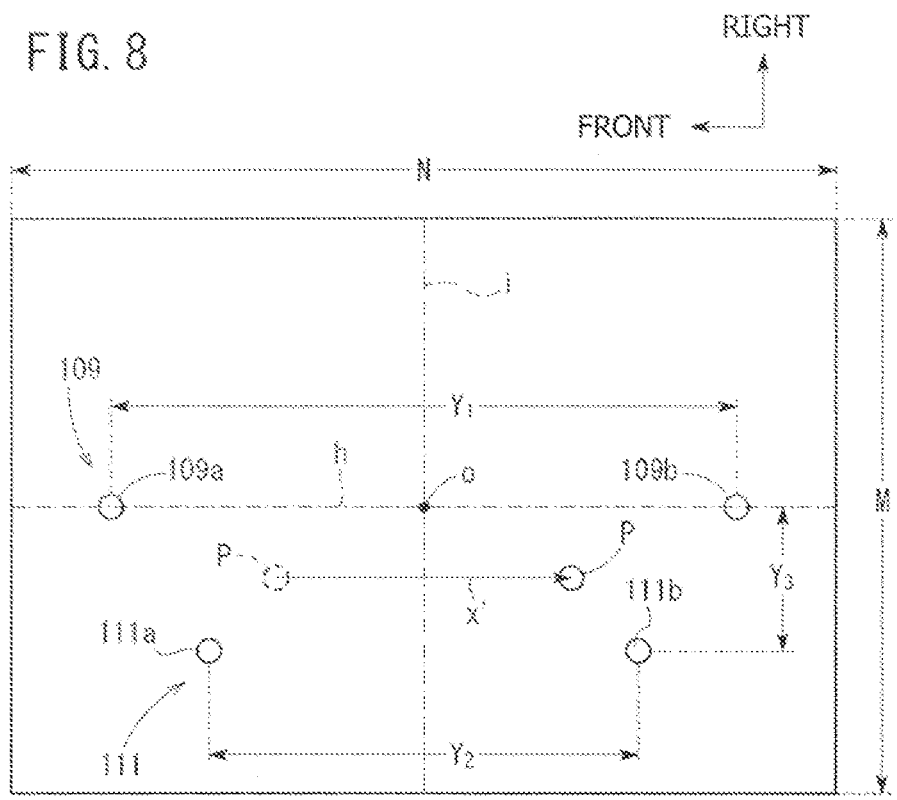

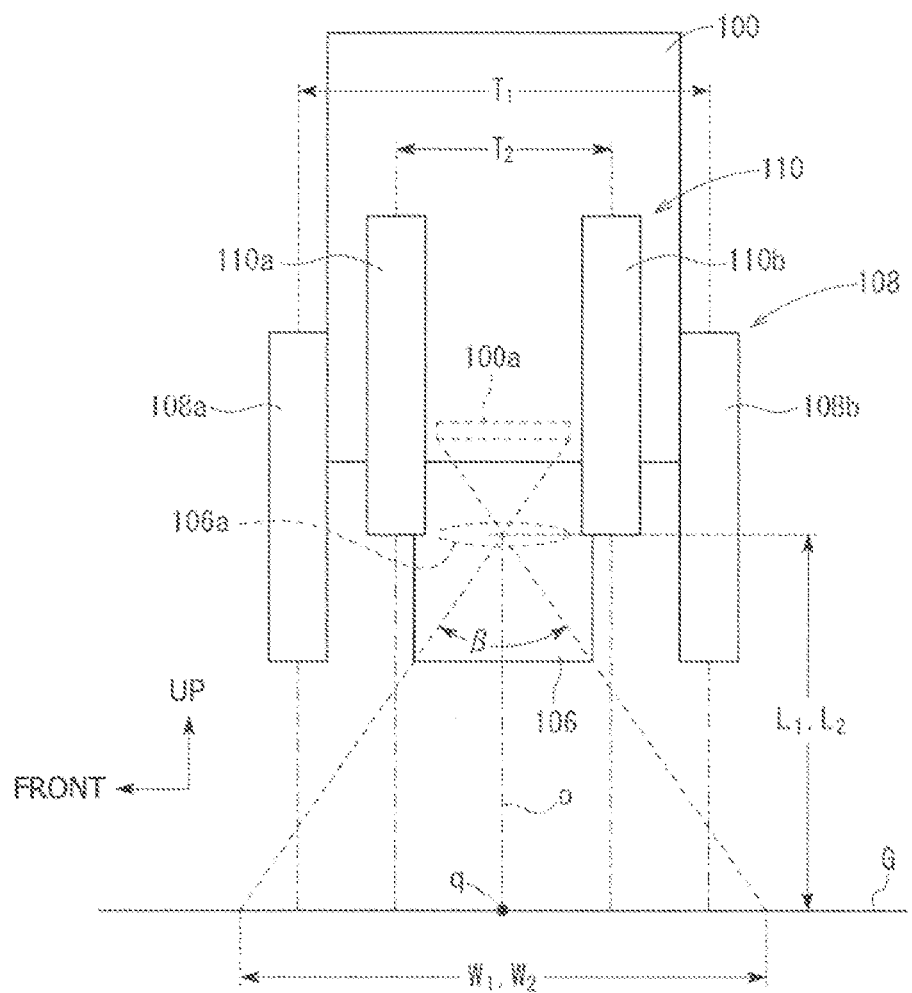

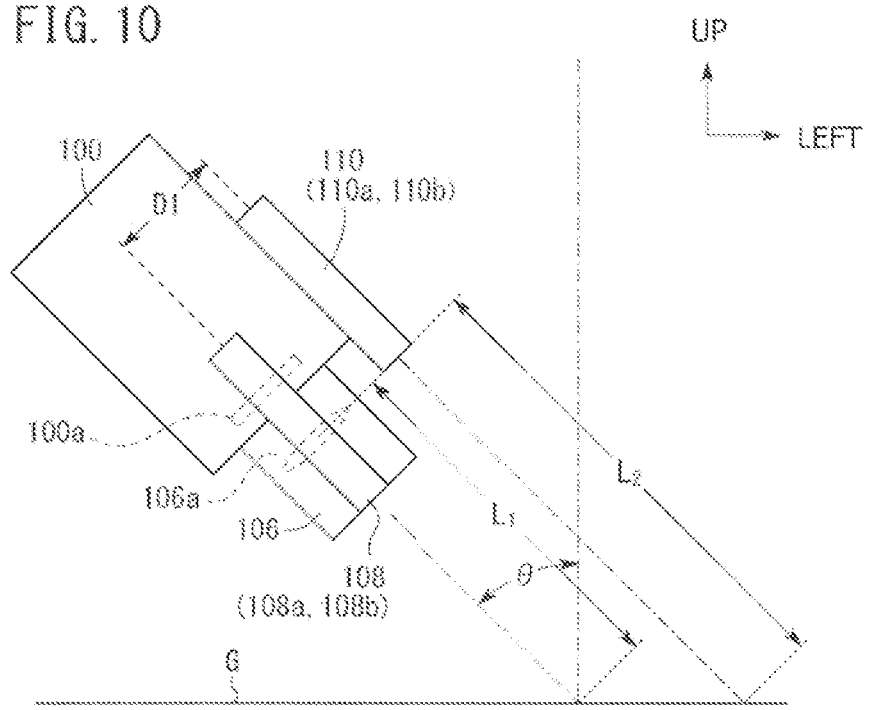

MOTORCYCLE HAVING A VIDEO CAMERA MOUNTED THEREON FOR MONITORING A ROAD SURFACE, AND METHODS OF USING SAME

CROSS-REFERENCE TO RELATED APPLICATIONS

The present invention claims priority under 35 USC 119 based on Japanese patent application No. 2013-017645, filed on Jan. 31, 2013. The entire subject matter of this priority document, including specification claims and drawings thereof, is incorporated by reference herein.

BACKGROUND OF THE INVENTION

1. Field of the Invention

The present invention relates to a motorcycle equipped with a video camera for monitoring a road surface.

2. Background Art

As described in Patent Document 1 shown below, a technique is disclosed for shooting a road surface with a video camera attached to a vehicle, and measuring the traveling speed and angle of the road surface relative to the camera, so as to use the measured data as vehicle speed and posture information and keep track of the road surface conditions.

[Patent Document 1] Japanese Patent Laid-Open No. 2007-278951

SUMMARY OF THE INVENTION

If a camera is attached to a four-wheeled motor vehicle as in Patent Document 1 given above, sufficient vibration-damping members can be provided between a power unit, such as an engine, and a vehicle body frame, thanks to comparatively more leeway in space available in a four-wheeled motor vehicle for arranging parts, than in a motorcycle. This ensures ease in installing the camera where it is less likely to be exposed to vibration caused, for example, by the engine, thus providing sharp images during vehicle operation.

In contrast, in the case of a motorcycle, an engine and other parts are provided between the front and rear wheels. This makes the task of securing a camera installation space extremely difficult to achieve. Besides, the engine vibration is larger than in a four-wheeled motor vehicle. Moreover, it is difficult or impossible to provide ample vibration-damping members between the power unit such as engine and the vehicle body frame. Therefore, a proper arrangement of a camera is desired to allow shooting sharp road surface images without upsizing the vehicle body.

In light of the foregoing, it is an object of the present invention to provide a motorcycle having a camera attached thereto in such a manner as to shoot sharper images.

A motorcycle (10) according to the present invention has the features listed below. Reference numbers are included in the following description corresponding to the drawings. Such reference numbers are provided for illustration and are not intended to limit the invention.

First feature: The motorcycle (10) has a power unit (28a) having a main shaft (29), a front wheel (18) provided forward of the power unit (28a), a rear wheel (30) provided rearward of the power unit (28a), a pivot shaft (25) provided on the power unit (28a) or a vehicle body frame (12) connected to the power unit (28a) at a position more rearward than the main shaft (29), and a swing arm (32) that is supported vertically swingably by the pivot shaft (25) and that pivotally supports the rear wheel (30) with a rear edge portion thereof. The motorcycle (10) includes video camera (100) adapted to shoot a road surface. The video camera (100) is arranged below the power unit (28a) or the swing arm (32) and more rearward than the center of the main shaft (29). The video camera (100) is fastened to and supported by at least either a lower portion of the power unit (28a) or a lower portion of the vehicle body frame (12) connected to the power unit (28a).

Second feature: The video camera (100) is provided more forward than the pivot shaft (25).

Third feature: The video camera (100) is housed in an under cowl (62) adapted to cover a lower portion of the power unit (28a), and an opening (112) is formed in the under cowl (62) at a position appropriate to an optical axis of the video camera (100).

Fourth feature: The video camera (100) is set to a view angle that ensures that no scene above the horizon is shot in the shot image even when the motorcycle (10) banks fully.

Fifth feature: The video camera (100) is set to the view angle that is large enough to include contact points of the rear wheel at the time of maximum banking of the motorcycle (10) as seen from the front of the motorcycle (10).

Sixth feature: The power unit (28a) is an engine adapted to rotate together with the rotation of a crankshaft serving as the main shaft (29), and includes, below the crankshaft, an oil pan (104) formed in such a manner as to bulge downward of the crankshaft. The video camera (100) is arranged in a concave recess (105) that is provided rearward of the oil pan (104).

Effects of the Invention

According to the first feature, video camera is provided below a power unit or swing arm, thus making it possible to arrange the video camera where there is only a small number of parts that might present an obstacle to shooting a road surface. Further, the video camera is supported by a power unit or a vehicle body frame connected to the power unit and arranged more rearward than the center of a main shaft that primarily generates vibration. This allows the video camera to be located where it is not likely to be affected by vibration. This ensures ease in shooting sharper images.

According to the second feature, the video camera is arranged more forward than a pivot shaft, thus making it possible to arrange the video camera with no possible interference with a vertically vibrating swing arm.

According to the third feature, the video camera is housed in an under cowl. This suppresses air resistance and protects the video camera from water, dust and other contaminants. This also provides improved appearance.

According to the fourth feature, the video camera is set to a view angle that ensures that no scene above the horizon is shot in the shot image even when the motorcycle banks fully. This prevents, to the extent possible, any image other than the road surface from appearing.

According to the fifth feature, the video camera is set to the view angle that is large enough to include contact points of the rear wheel at the time of maximum banking of the motorcycle. This makes it possible to shoot the road surface on which the rear wheel will probably run at all times irrespective of a bank angle.

According to the sixth feature, the power unit is an engine adapted to rotate together with the rotation of a crankshaft serving as a main shaft. The power unit includes an oil pan below the crankshaft. The oil pan is formed in such a manner as to bulge downward of the crankshaft. The video camera is provided in a concave recess that is provided rearward of the oil pan. This makes it possible to secure a capacity of the oil pan and a space for arranging the video camera.

BRIEF DESCRIPTION OF THE DRAWINGS

FIG. 8 is a diagram illustrating an image shot by a camera.

FIG. 9 is a diagram illustrating the camera, first mark irradiation unit, and second mark irradiation unit as seen from the left of the motorcycle.

FIG. 10 is a diagram illustrating the camera, the first mark irradiation unit, and the second mark irradiation unit as seen from the front of the motorcycle.

DETAILED DESCRIPTION OF ILLUSTRATIVE EMBODIMENTS

A detailed description will be given below of the vehicle speed calculator according to the present invention with reference to the accompanying drawings by citing a selected illustrative embodiment. The present description is intended to illustrate, rather than to limit the invention.

Figure 1:
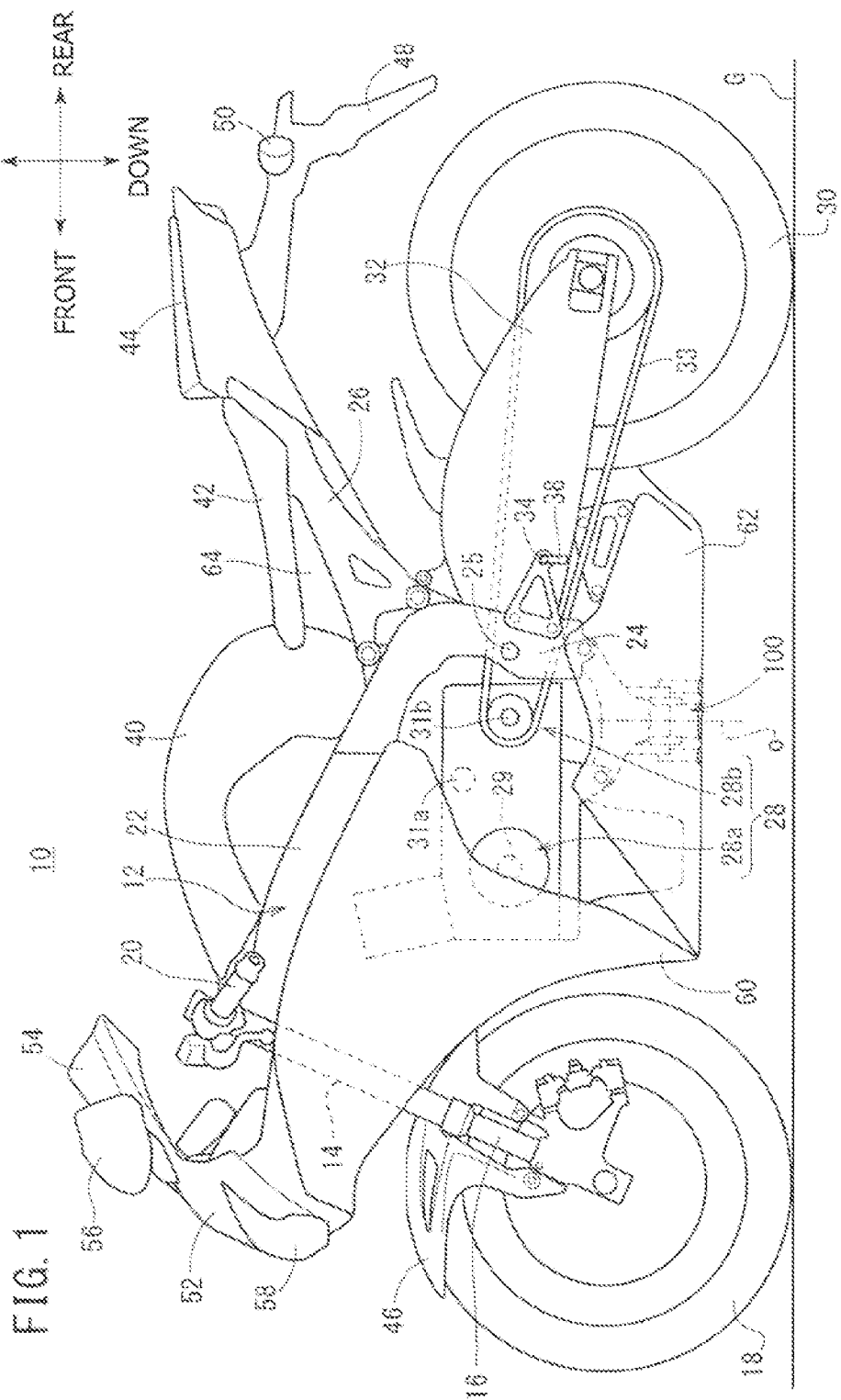
FIG. 1 is a side view of a motorcycle to which a vehicle speed calculator is mounted.
Figure 2:
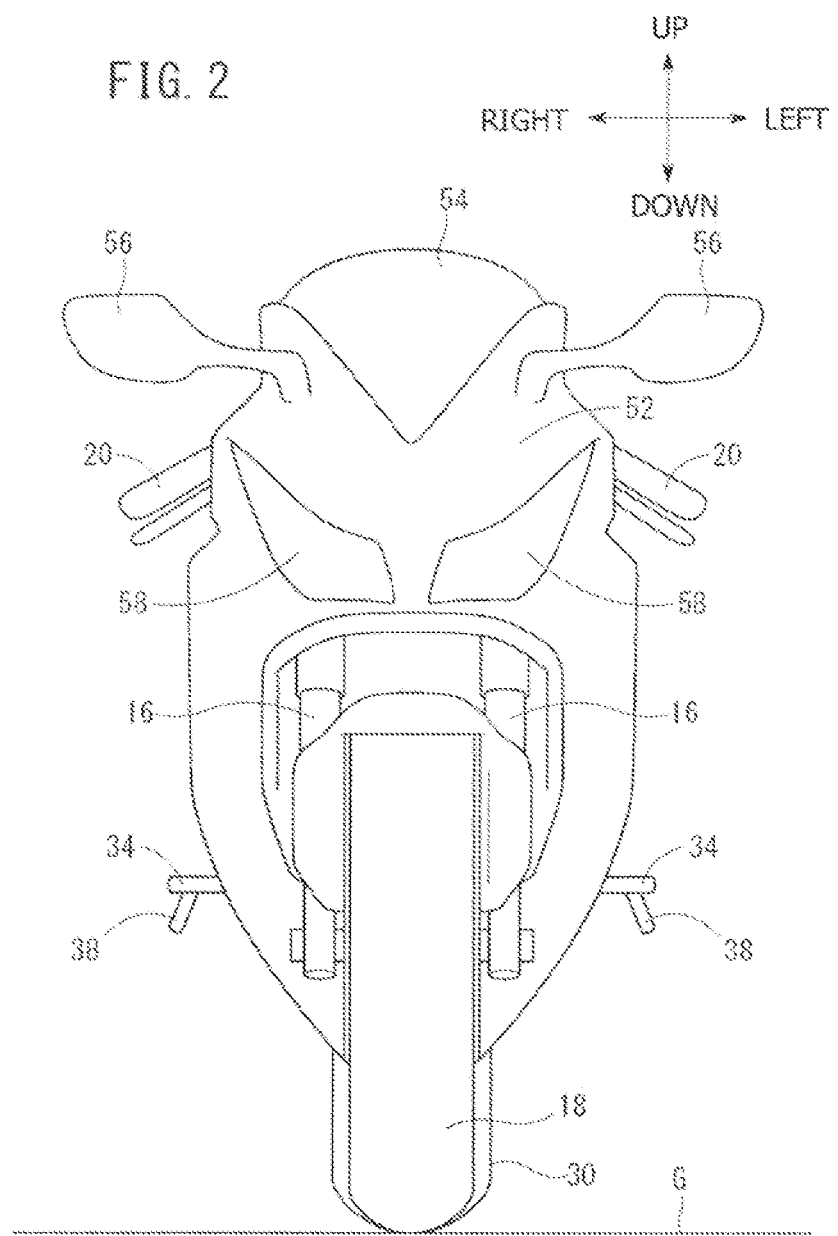
FIG. 2 is a front view of the motorcycle shown in FIG. 1.

FIG. 1 is a side view of a motorcycle 10 to which the vehicle speed calculator is mounted. FIG. 2 is a front view of the motorcycle 10 shown in FIG. 1. It should be noted that, unless otherwise specified, the longitudinal, vertical and horizontal directions will be described in accordance with the directions of the arrows shown in FIGS. 1 and 2.

The motorcycle (vehicle) 10 has a vehicle body frame 12, a head pipe 14, a pair of left and right front forks 16, a front wheel 18 rotatably mounted between the lower ends of the front forks 16, and a steerable handlebar 20, which is operatively attached to the front forks and is provided for steering the vehicle. The head pipe 14 is provided on the front edge portion of the vehicle body frame 12. The pair of left and right front forks 16 is pivotally supported by the head pipe 14. The front wheel 18 is a steering wheel pivotally supported by the pair of left and right front forks 16. The handlebar 20 is operatively attached to the upper portion of the front forks 16.

The vehicle body frame 12 includes a pair of left and right main frames 22, a pair of left and right pivot plates 24, and a pair of left and right seat frames 26. The pair of left and right main frames 22 extends rearward from the head pipe 14. The pair of left and right pivot plates 24 is provided on the rear side of the pair of left and right main frames 22. The pair of left and right seat frames 26 is provided on the pair of left and right pivot plates 24 and extends rearward and diagonally upward. A power unit 28 is supported between the left and right main frames 22 to produce power. The power unit 28 houses an engine 28a, a power unit, and a transmission 28b inside its casing.

A swing arm 32 that pivotally supports a rear wheel (wheel) 30, a driving wheel, with the rear edge portion thereof is supported vertically swingably by a swing arm pivot shaft (pivot shaft) 25 of the pivot plates 24. It should be noted that the swing arm pivot shaft 25 may be provided on the engine 28a or power unit 28.

The driving force (rotating force) of a crankshaft 29, the main shaft of the engine 28a, is transferred to a main shaft 31a of the transmission 28b first, and then output from a counter shaft 31b. The driving force output from the counter shaft 31b is transferred to the rear wheel 30 via a chain 33.

Figure 6:
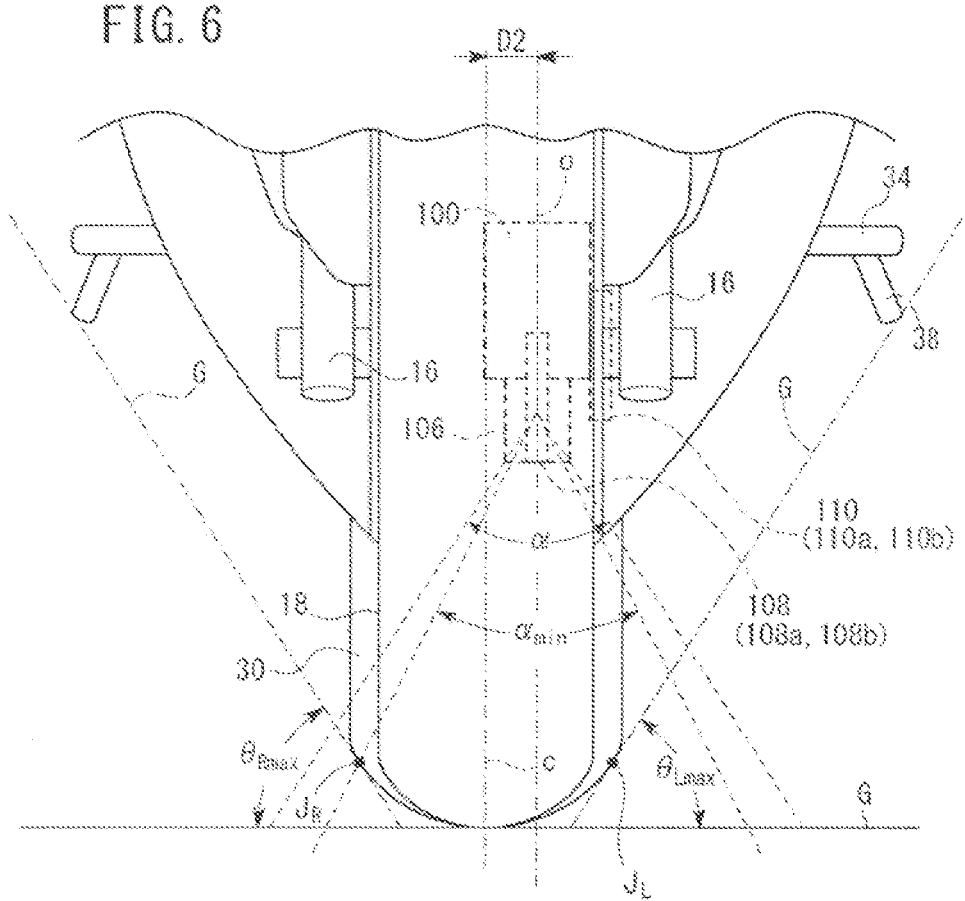
FIG. 6 is an enlarged view of main parts shown in FIG. 2.

A pair of left and right foot rests 34 is attached, each to one of the pivot plates 24, so that each foot of a driver is placed on one of the foot rests 34. A bank sensor 38 is provided on each of the foot rests 34 to set a limit for a maximum bank angle θmax of the motorcycle 10. As illustrated in FIG. 6, when the motorcycle 10 banks to the maximum bank angle θmax, one of the bank sensors 38 comes into contact with a road surface G, restricting a bank angle (roll angle) θ from increasing further. It should be noted that the maximum bank angle on the left side of the motorcycle 10 is denoted by θLmax, and that on the right side thereof by θRmax. The maximum bank angles θLmax and θRmax will be collectively referred to as the maximum bank angle θmax.

A fuel tank 40 adapted to store fuel is provided above the pair of left and right main frames 22. A driver's seat 42 on which the driver is seated is provided rearward of the fuel tank 40 and above the pair of left and right seat frames 26. A pillion seat 44 on which a pillion passenger is seated is provided rearward of the driver's seat 42. A front fender 46 is provided on the pair of left and right front forks 16. A rear fender 48 is provided on the rear portion of the pair of left and right seat frames 26. The same fender 48 supports a rear turn indicator 50.

The motorcycle 10 includes an upper cowl 52, a window screen 54, a rear view mirror 56, a headlight 58, a middle cowl 60, an under cowl 62, and a side cover 64. The upper cowl 52 is provided on the vehicle body frame 12 to protect the front side of the motorcycle 10. The window screen 54 is provided above the upper cowl 52. The rear view mirror 56 is provided on the upper portion of the upper cowl 52 to allow the driver to check what is behind the driver. The headlight 58 is provided on the front portion of the upper cowl 52 to shine light forward. The middle cowl 60 protects the front lateral sides of the motorcycle 10. The under cowl 62 is provided on the lower portion of the middle cowl 60 and extends rearward of the vehicle. The side cover 64 is provided above the seat frames 26 to cover areas from the upper portion of the seat frames 26 to the lower portion of the driver's seat 42. A front turn indicator is built into the rear view mirror 56.

A camera (video camera) 100 is provided below the power unit 28 to shoot the road surface G, from below the power unit 28, during vehicle operation. A description will be given next of an attachment structure of the camera 100 making up a primary input for the vehicle speed calculator of the motorcycle 10.

Figure 3:
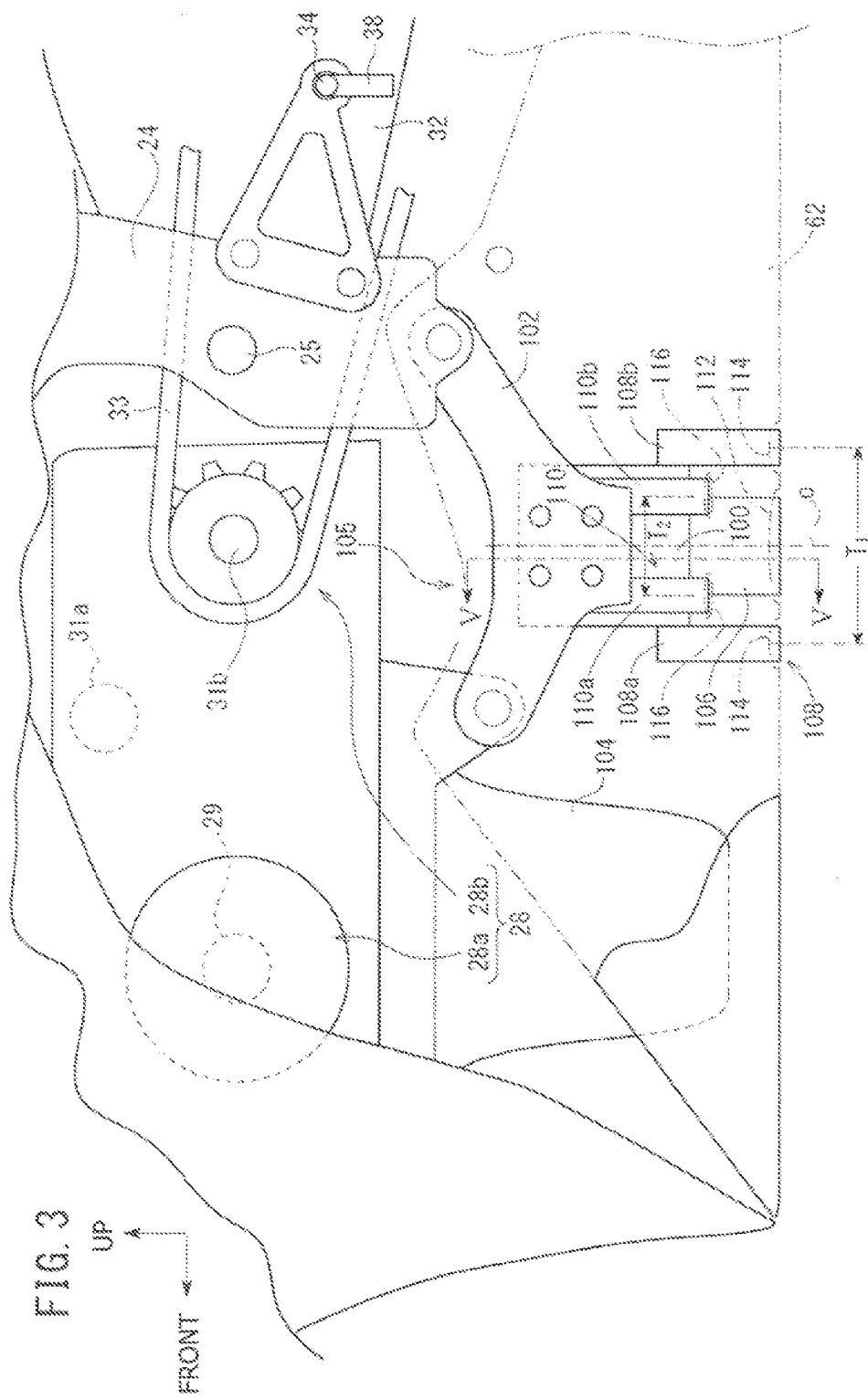
FIG. 3 is a diagram illustrating the camera attachment structure as seen from the left of a power unit.
Figure 4:
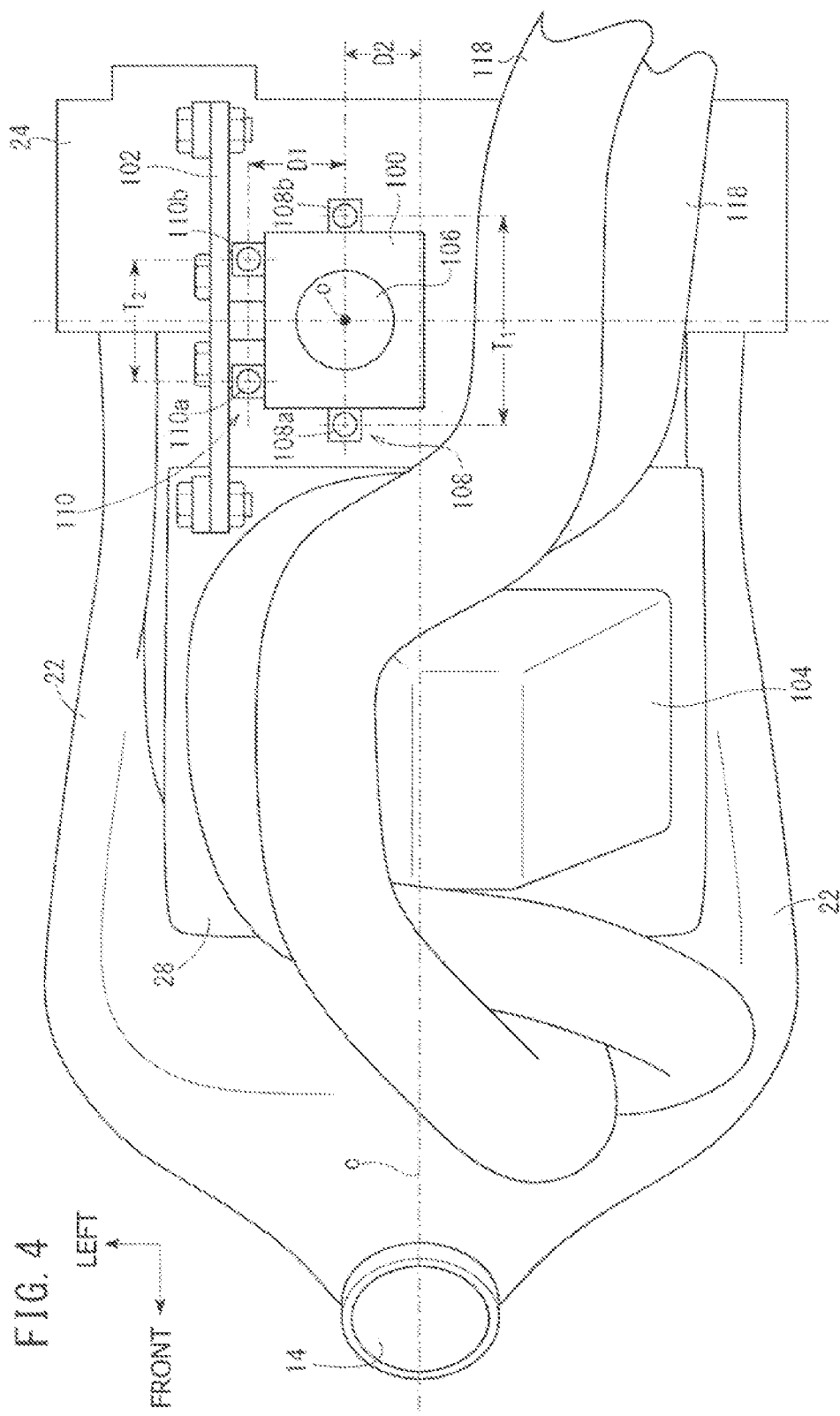
FIG. 4 is a diagram illustrating the camera attachment structure as seen from the bottom of the power unit.
Figure 5:
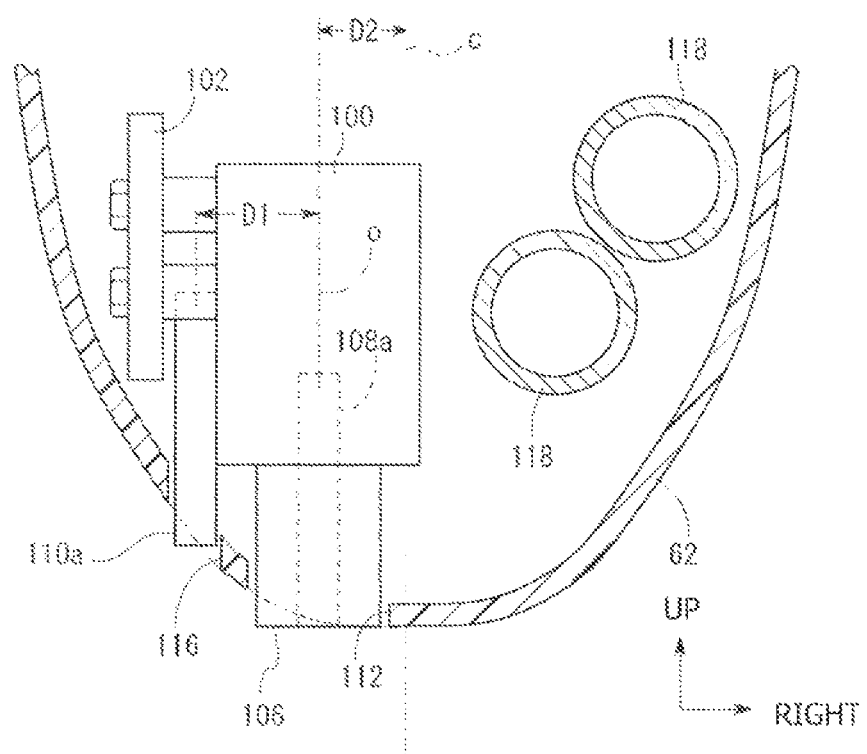
FIG. 5 is an arrow sectional view along line V-V in FIG. 3.

FIG. 3 is a diagram illustrating the attachment structure of the camera 100 as seen from the left side of the power unit 28. FIG. 4 is a diagram illustrating the attachment structure of the camera 100 as seen from the bottom of the power unit 28. FIG. 5 is an arrow sectional view of the attachment structure of the camera 100, taken along line V-V in FIG. 3. It should be noted that unnecessary parts are omitted from the drawing for simplification of the description.

As illustrated in FIG. 3, the camera 100 is located below the power unit 28 (engine 28a), and more rearward than the center of the crankshaft 29 and forward of the swing arm pivot shaft 25. The camera 100 is also fastened to and supported by the lower portions of the power unit 28 (engine 28a) and the pivot plates 24. More specifically, the camera 100 is attached to a stay 102 that is suspended by the lower portions of the power unit 28 and the pivot plates 24. It should be noted that the camera 100 need only be fastened to and supported by at least either the lower portion of the power unit 28 or the lower portion of the pivot plates 24. The camera 100 may be provided below the swing arm 32.

The engine 28a includes an oil pan 104 formed below the crankshaft 29 in such a manner as to bulge (protrude) downwardly. The camera 100 and the stay 102 are provided in a concave recess 105 that is provided rearward of the oil pan 104. The concave recess 105 is formed in back of the downwardly bulging oil pan 104.

A lens barrel 106 is attached at the center of the lower portion of the camera 100. The lens barrel 106 has a lens 106a (refer to FIG. 9) adapted to form an image of a subject on an imaging element 100a (refer to FIG. 9). The optical axis of the lens 106a serves as an optical axis of the camera 100. It is preferred that the optical axis o of the camera 100 should be designed in such a manner as to be approximately vertical to the flat road surface G when the motorcycle 10 is upright to the road surface G. A first mark irradiation unit 108 and second mark irradiation unit 110 are attached to the camera 100.

The first mark irradiation unit 108 irradiates a first mark to the road surface G in parallel with the optical axis o of the camera 100 (in parallel therewith as seen from the side and front). The first mark is formed in such a manner as to have a longitudinal reference distance T1 [mm] (e.g., 90 mm). The first mark irradiation unit 108 is attached at the front and rear of the camera 100 in such a manner as to irradiate the first mark in the shooting range of the camera 100.

The first mark irradiation unit 108 has two laser pointers 108a and 108b that are arranged in the longitudinal direction. The laser pointers 108a and 108b irradiate laser beams. The laser pointers 108a and 108b are provided, one at the front and the other at the rear, relative to the optical axis o of the camera 100 in such a manner that their axial lines (optical axes) are aligned in the longitudinal direction.

In the present embodiment, the optical axis o of the camera 100 is located on a line connecting the axial lines of the two laser pointers 108a and 108b. That is, the two laser pointers 108a and 108b are arranged in such a manner that their axial lines are also aligned with the optical axis o of the camera 100 in the longitudinal direction (refer to FIG. 4). The two laser pointers 108a and 108b are arranged at the reference distance T1 from each other in the longitudinal direction. This allows the camera to irradiate two points, i.e., a first mark, on the road surface G. The two points are formed in such a manner as to have the reference distance T1 therebetween in the longitudinal direction.

The second mark irradiation unit 110 irradiates a second mark to the road surface G in parallel with the optical axis o of the camera 100 (in parallel therewith as seen from the side and front). The second mark is formed in such a manner as to have a longitudinal given distance T2 [mm] (e.g., 70 mm). The second mark irradiation unit 110 is attached on the left side of the camera 100 in such a manner as to irradiate the second mark in the shooting range of the camera 100.

The second mark irradiation unit 110 has two laser pointers 110a and 110b that are arranged in the longitudinal direction. The laser pointers 110a and 110b irradiate laser beams. The laser pointers 110a and 110b are provided, one at the front and the other at the rear, relative to the optical axis o of the camera 100 in such a manner that their axial lines (optical axes) are aligned in the longitudinal direction (refer to FIG. 4). The second mark irradiation unit 110 is arranged to be offset to the left relative to the first mark irradiation unit 108 by a distance (offset distance) D1 (e.g., 35 mm). The two laser pointers 110a and 110b are arranged at the given distance T2 from each other in the longitudinal direction. This allows the camera to irradiate two additional points (second mark) on the road surface G. The two points are formed in such a manner as to have the given distance T2 therebetween in the longitudinal direction.

As illustrated in FIGS. 3 and 5, the camera 100, the first mark irradiation unit 108, and the second mark irradiation unit 110 are housed in the under cowl 62 that covers the lower portion of the power unit 28. Openings 112, 114 and 116 are formed in the under cowl 62. The opening 112 is provided to shoot an image and located at a position appropriate to the optical axis o of the camera 100. The opening 114 is provided to irradiate the first mark and located at a position appropriate to the optical axis of the first mark irradiation unit 108. The opening 116 is provided to irradiate the second mark and located at a position appropriate to the optical axis of the second mark irradiation unit 110. Thanks to the openings 112, 114 and 116, the under cowl 62 does not interfere with shooting by the camera 100 or irradiation by the first mark irradiation unit 108 and the second mark irradiation unit 110. Although provided independently of each other, the openings 112, 114 and 116 may, optionally, be connected to each other.

As illustrated in FIG. 4, the camera 100 is arranged where the optical axis o thereof is offset to the left from a vehicle width centerline c by a distance (offset distance) D2 (e.g., 35 mm). The second mark irradiation unit 110 is arranged on the left side of the camera 100. The smaller the offset distance D2, the closer the optical axis o of the camera 100 to the vehicle width centerline c. Therefore, the smaller the offset distance D2, the better, with "0" being the best. As illustrated in FIG. 4, on the other hand, the oil pan 104 is provided slightly to the right of the power unit 28. Therefore, the exhaust pipe 118 adapted to transport exhaust gas of the engine 28a is arranged in such a manner as to run on the left side of the oil pan 104, then bend to the right and run on the right side of the camera 100. As described above, the second mark irradiation unit 110 is attached on the side of the camera 100 free from, and situated opposite the exhaust pipe 118. This makes it possible to bring the optical axis o of the camera 100 close to the vehicle width center. It should be noted that the exhaust pipe 118 is also provided in the under cowl 62.

A description will be given next of the view angle of the camera 100. FIG. 6 is an enlarged view of the main parts shown in FIG. 2. It is preferred that a view angle α of the camera 100 along the vehicle width (hereinafter the vehicle width view angle) should be set to fall within the range of αmin≤α≤αmax. αmin is the angle at which contact points JL and JR of the rear wheel 30 with the road surface G (rear wheel contact points) fit into the view angle of the camera 100 as seen from the front when the motorcycle 10 banks to the maximum bank angle θmax as seen from the front of the vehicle. αmax is the angle expressed by αmax=(90°−max. bank angle θmax)×2. If the vehicle width view angle α of the camera 100 is αmax, one side of the vehicle width view angle α of the camera 100 is approximately parallel with the road surface G when the motorcycle 10 banks to the maximum bank angle θmax, thus causing the camera 100 to shoot the horizon. Therefore, setting the vehicle width view angle α smaller than the angle αmax keeps the shooting range at or below the horizon (ensures that no scene above the horizon is shot in the shot image), thus making it possible to shoot many images of the road surface G.

A description will be given here of the reason why the vehicle width view angle α of the camera 100 has been set equal to or greater than αmin and smaller than αmax. Considering the verification of the road surface conditions, for example, during shooting of the road surface G below the motorcycle 10 by the camera 100, there is a demand to shoot, to the extent possible, the actual road surface on which the wheel, the rear wheel 30 in particular will probably run. Further, in the case of the motorcycle 10, tire contact points vary depending on the bank angle θ. Therefore, it is desirable to secure the vehicle width view angle α that is large enough to include at least both the rear wheel contact points JL and JR at the time of the maximum left and right banking, respectively.

On the other hand, expanding the shooting range by unnecessarily increasing the vehicle width view angle α leads to unnecessarily obtaining image information other than the road surface G, thus resulting in poor efficiency. During banking in particular, the rear wheel contact point moves to one side, left or right. As a result, the center of the shot image moves toward the direction (other side) away from the contact point with the road surface on which the rear wheel 30 will probably run. As a consequence, the area near the rear wheel contact points JL and JR, an area of interest, is limited to an extremely small portion of the shot image. Therefore, the smaller the vehicle width view angle α of the camera 100, the better as long as the rear wheel contact points JL and JR, at the time of the maximum banking as seen from the front of the vehicle, fit into the vehicle width view angle α. From this point of view, the vehicle width view angle α of the camera 100 has the relation αmin≤α<αmax.

Further, in order to secure a necessary shooting width while at the same time reducing the view angle of the camera 100 to the extent possible, it is necessary to arrange the focus of the camera 100 as upward as possible. In the present embodiment, therefore, the camera 100 is arranged in the concave recess 105 located more forward than the swing arm pivot shaft 25 and rearward of the oil pan 104. This arranges the camera 100 as upward as possible, thus making it possible to meet the above requirement for the vehicle width view angle α of the camera 100.

It should be noted that, as understood from FIG. 6, the optical axis o should preferably be arranged at least within the tire width of the rear wheel 30. It is preferred that the camera 100, the first mark irradiation unit 108, and the second mark irradiation unit 110 should be arranged inside the tire width of the rear wheel 30. Further, it is preferred that at least the camera 100 and the first mark irradiation unit 108 should be arranged inside the tire width of the front wheel 18.

As described above, the camera 100 is arranged below the engine 28a or the swing arm 32, thus making it possible to arrange the camera 100 where there is only a small number of parts that might present an obstacle to shooting the road surface. Further, the camera 100 is supported at least by either the engine 28a or at least one of the pivot plates 24 making up the vehicle body frame 12. The camera 100 is arranged more rearward than the center of the crankshaft 29 that primarily generates vibration. This allows the camera 100 to be located where it is not likely to be affected by vibration. This ensures ease in shooting sharper images.

The camera 100 is arranged more forward than the swing arm pivot shaft 25, thus making it possible to arrange the camera 100 with no possible interference with the vertically vibrating swing arm 32. Further, the camera 100 is arranged in the concave recess 105 provided rearward of the oil pan 104. This makes it possible to secure a capacity of the oil pan 104 and a space for arranging the camera 100.

The camera 100 is housed in the under cowl 62. This suppresses air resistance and protects the camera 100 from water, dust and other contaminants. This also provides improved appearance. It is more advantageous in suppressing air resistance and protect against dust particularly if the camera 100 and the laser pointers 108a, 108b, 110a and 110b are kept under the surface of the under cowl 62. Further, the camera 100 is set to the vehicle width view angle α that ensures that no scene above the horizon is shot in the shot image even when the motorcycle 10 banks fully. This prevents, to the extent possible, any image other than the road surface G from appearing.

The vehicle width view angle α of the camera 100 is set in such a manner that the rear wheel contact points JL and JR at the time that the motorcycle 10 banks fully as seen from the front of the vehicle, respectively, fit into the view angle of the camera 100 as seen from the front. This makes it possible to shoot the road surface G on which the rear wheel 30 will probably run at all times irrespective of the bank angle θ.

Figure 7:
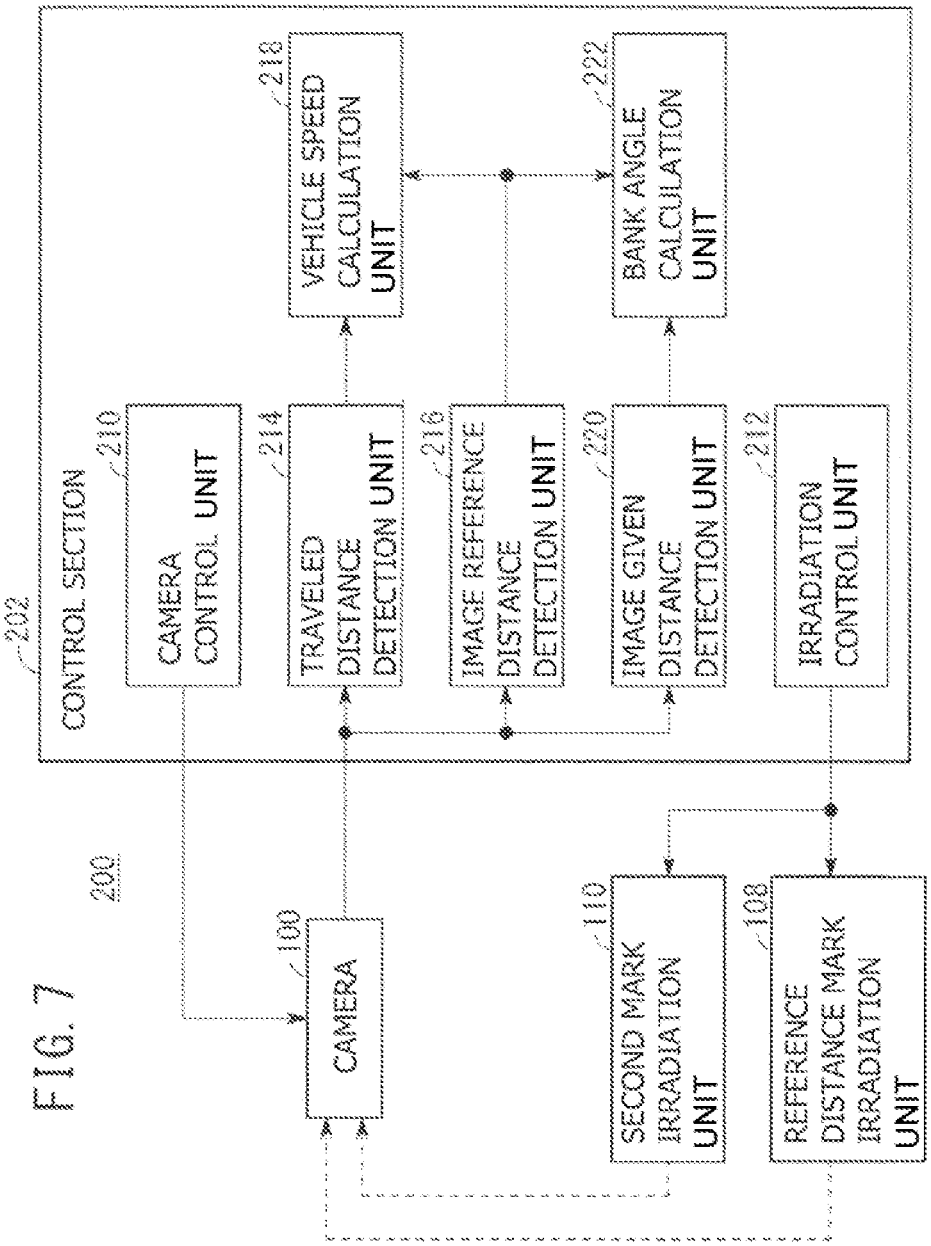
FIG. 7 is a functional block diagram of the vehicle speed calculator.

FIG. 7 is a functional block diagram of the vehicle speed calculator 200. The vehicle speed calculator 200 includes the camera 100, the first mark irradiation unit 108, the second mark irradiation unit 110, and a control section 202. The control section 202 has a camera control unit 210, an irradiation control unit 212, a traveled distance detection unit 214, an image reference distance detection unit 216, a vehicle speed calculation unit 218, an image given distance detection unit 220, and a bank angle calculation unit 222. The control section 202 is a computer having a CPU, memory and other parts. The control section 202 serves as the control section 202 of the present embodiment by the CPU loading a program from the memory.

The camera control unit 210 controls shooting performed by the camera 100. The camera control unit 210 controls the camera 100 in such a manner as to shoot the road surface G at given intervals (frame rate) (e.g. 500 fps) during driving of the motorcycle 10. The irradiation control unit 212 controls irradiation performed by the first mark irradiation unit 108 and the second mark irradiation unit 110. The irradiation control unit 212 controls the first mark irradiation unit 108 and the second mark irradiation unit 110 in such a manner as to irradiate light to the road surface G during driving of the motorcycle 10. At this time, the irradiation control unit 212 may control the first mark irradiation unit 108 and the second mark irradiation unit 110 in such a manner as to irradiate light during an exposure period of the camera 100 and stop irradiating light during any other period.

The traveled distance detection unit 214 detects the traveled distance x [pixels/sec] per unit time (e.g., per second) of the feature point p in the shooting range shot by the camera 100 in the shot image. That is, the traveled distance detection unit 214 detects the traveled distance x per unit time of the feature point p by detecting the location of the feature point p, available in an image shot previously (previously shot image), in an image shot next (currently shot image) based on block matching, representative point matching or other technique.

Here, the feature point p is a point extracted from a pattern on the road surface G, shading produced by projections and recessions, and so on. Further, the traveled distance x is strictly the traveled distance x in the shot image. Therefore, even if the vehicle speed v [mm/sec] is the same, the value thereof varies depending on the height of the motorcycle 10 (i.e., height of the camera 100 relative to the road surface G). For example, even if the vehicle speed v is the same but the vehicle is tall, the traveled distance x is smaller than if the vehicle is short. It should be noted that the shot image shown in FIG. 8 illustrates the traveled distance x' per 1/500 of a second.

The image reference distance detection unit 216 detects an image reference distance Y1 [pixels], a longitudinal length of the first mark irradiated by the first mark irradiation unit 108 in the shot image. The longitudinal direction in the shot image is the same as the longitudinal direction of the motorcycle 10. The image reference distance Y1 represents the reference distance T1 in the shot image and therefore varies depending on the height of the motorcycle 10. For example, even if the vehicle speed v is the same but the vehicle is tall, the image reference distance Y1 is smaller than if the vehicle is short. It should be noted that the image reference distance Y1 is shown in the shot image of FIG. 8. It should be noted that reference symbol 109 in FIG. 8 represents a first mark in the shot image. The first mark 109 is made up of points 109a and 109b.

The points 109a and 109b should be located equidistantly from the optical axis o. That is, it is preferred that the laser pointers 108a and 108b should be provided in such a manner as to irradiate light in parallel with the optical axis o at the positions equidistant from the optical axis o. The optical axis o is located at the center of the shot image. It should be noted that straight lines h and i are shown in FIG. 8 for reasons of convenience. The straight line h extends in the longitudinal direction of the shot image from the center (optical axis o) of the shot image. The straight line i extends in the horizontal direction of the shot image from the center (optical axis o) of the shot image. The points 109a and 109b of the first mark 109 are located on the straight line h.

The vehicle speed calculation unit 218 calculates the vehicle speed v [mm/sec] from the traveled distance x detected by the traveled distance detection unit 214. Here, the traveled distance x varies with change in the vehicle height even if the vehicle speed v is the same. The same distance x varies all the more for the motorcycle 10 whose height is likely to change as a result of acceleration and deceleration or banking as compared to a four-wheeled vehicle. In order to provide improved accuracy of the vehicle speed v even in the event of a change in the vehicle height, the vehicle speed calculation unit 218 calculates the vehicle speed v from the traveled distance x per unit time detected by the traveled distance detection unit 214 using the image reference distance Y1 detected by the image reference distance detection unit 216 and the reference distance T1 of the first mark 109. More specifically, the vehicle speed v is calculated by using Formula (1) shown below.

$$v\left[\frac{mm}{sec}\right] = \left(x\left[\frac{pixel}{sec}\right] \times T_1[mm]\right) \Big/ Y_1[pixel] \quad (1)$$

The image given distance detection unit 220 detects an image given distance $Y_2$ [pixels], a longitudinal length of the second mark irradiated by the second mark irradiation unit 110 in the shot image. The image given distance $Y_2$ represents the given distance $T_2$ in the shot image and therefore varies depending on the height of the motorcycle 10 or the bank angle θ. For example, even if the vehicle speed v is the same but the vehicle is tall, the image given distance $Y_2$ is smaller than if the vehicle is short. It should be noted that the image given distance $Y_2$ is shown in the shot image of FIG. 8. Further, N in FIG. 8 represents the longitudinal distance [pixels] of the shot image, and M the horizontal distance [pixels] of the shot image.

It should be noted that reference symbol 111 in FIG. 8 represents a second mark in the shot image. The second mark 111 is made up of points 111a and 111b. The points 111a and 111b should more preferably be located equidistantly from the optical axis o. That is, it is preferred that the laser pointers 110a and 110b should be provided in such a manner as to irradiate light in parallel with the optical axis o at the positions equidistant from the optical axis o. Further, although the longer N shown in FIG. 8, the better, N should preferably be set in such a manner that neither the front wheel 18 nor the rear wheel 30 are included in the shot image.

The bank angle calculation unit 222 calculates the bank angle θ of the motorcycle 10 based on the reference distance $T_1$, the given distance $T_2$, the image reference distance $Y_1$ detected by the image reference distance detection unit 216, and the image given distance $Y_2$ detected by the image given distance detection unit 220. A description will be given of a calculation method of the bank angle θ of the motorcycle 10 with reference to FIGS. 9 and 10. It should be noted that FIG. 9 illustrates the camera 100, the first mark irradiation unit 108, and the second mark irradiation unit 110 as seen from the left of the motorcycle 10. FIG. 10 illustrates the camera 100, the first mark irradiation unit 108, and the second mark irradiation unit 110 as seen from the front of the motorcycle 10.

First, the bank angle calculation unit 222 calculates an actual distance of the shooting range (hereinafter referred to as the actual shooting range width) $W_1$ [mm] based on the image reference distance $Y_1$ and an actual shooting range width $W_2$ [mm] based on the image given distance $Y_2$ shown in FIG. 9. More specifically, the bank angle calculation unit 222 calculates the actual shooting range widths $W_1$ and $W_2$ using Formulas (2) and (3) shown below.

[Formula 2]

$$W_1 [mm]=(T_1 [mm]/Y_1[pixel]) \times N[pixel] \quad (2)$$

[Formula 3]

$$W_2 [mm]=(T_2 [mm]/Y_2[pixel]) \times N[pixel] \quad (3)$$

The bank angle calculation unit 222 calculates a distance $L_1$ [mm] (refer to FIG. 9) from an intersection point q between the optical axis o of the camera 100 and the road surface G to the center of the lens 106a based on the calculated actual shooting range width $W_1$ using Formula (4) shown below. Further, the bank angle calculation unit 222 calculates a distance $L_2$ [mm] (refer to FIG. 9) from the intersection point q between the optical axis o of the camera 100 and the road surface G to the center of the lens 106a based on the calculated actual shooting range width $W_2$ using Formula (5) shown below. It should be noted that the longitudinal view angle of the camera 100 (longitudinal view angle) is represented by β.

[Formula 4]

$$L_1 [mm]=(W_1 [mm] \times 0.5)/\tan(\beta \times 0.5) \quad (4)$$

[Formula 5]

$$L_2 \text{ [mm]} = (W_2 \text{ [mm]} \times 0.5)/\tan(\beta \times 0.5) \quad (5)$$

The bank angle calculation unit 222 calculates the bank angle θ shown in FIG. 10 using the calculated distances $L_1$ and $L_2$ and the offset distance D1 between the first mark irradiation unit 108 and the second mark irradiation unit 110. More specifically, the bank angle calculation unit 222 calculates the bank angle θ using Formula (6) shown below.

[Formula 6]

$$\theta = \tan^{-1}\{(L_2 \text{ [mm]} - L_1 \text{ [mm]})/D1 \text{ [mm]}\} \quad (6)$$

The vehicle speed v and the bank angle θ calculated by the vehicle speed calculator 200 are used, for example, for traction control and ABS control.

As described above, according to the above embodiment, the first mark 109 is irradiated to the road surface G in the shooting range of the camera 100 in parallel with the optical axis o of the camera 100. The same mark 109 is formed in such a manner as to have the reference distance T1 in the longitudinal direction. This allows to project the mark, an indicator of the actual distance, into the shot image, thus making it possible to find the vehicle speed v with high accuracy even in the event of a change in vehicle height.

The two laser pointers 108*a* and 108*b* making up the first mark irradiation unit 108 irradiate the first mark 109 in parallel with the optical axis o of the camera 100. The same pointers 108*a* and 108*b* are arranged away from each other in the longitudinal direction. This makes it possible to configure the extremely accurate and simple first mark irradiation unit 108 for irradiating light in parallel with the optical axis o of the camera 100 in such a manner as to maintain the reference distance T1. Further, the two laser pointers 108*a* and 108*b* are provided, one at the front and the other at the rear, relative to the optical axis o of the camera 100. This ensures ease in securing the large reference distance T1, thus contributing to reduced impact of error on image recognition and providing improved calculation accuracy of the vehicle speed v. Still further, the two laser pointers 108*a* and 108*b* are arranged in such a manner that their axial lines are aligned with the optical axis o of the camera 100 in the longitudinal direction. This makes it unlikely that the reference distance T1 will vary even during banking of the motorcycle 10, thus providing improved calculation accuracy of the vehicle speed v.

Further, the second mark 111 is irradiated to the road surface G at a position offset at least to the left of the vehicle relative to the first mark 109 in the shooting range. This makes it possible to find the bank angle θ of the motorcycle 10. The second mark 111 is formed in such a manner as to have the given distance T2 in the longitudinal direction. The second mark irradiation unit 110 irradiates the second mark 111 in parallel with the optical axis o of the camera 100. This makes it possible to find the bank angle θ of the motorcycle 10 with high accuracy.

The two laser pointers 110*a* and 110*b* making up the second mark irradiation unit 110 irradiate the second mark 111 in parallel with the optical axis o of the camera 100 and are arranged away from each other in the longitudinal direction. This makes it possible to configure the extremely accurate and simple second mark irradiation unit 110 for irradiating light in parallel with the optical axis o of the camera 100 in such a manner as to maintain the reference distance T2. Further, the two laser pointers 110*a* and 110*b* are provided, one at the front and the other at the rear, relative to the optical axis o of the camera 100. This ensures ease in securing the large given distance T2, thus contributing to reduced impact of error on image recognition and providing improved calculation accuracy of the bank angle θ of the motorcycle 10. Still further, the two laser pointers 110*a* and 110*b* are arranged in such a manner that their axial lines are aligned in the longitudinal direction. This makes it unlikely that the given distance T2 will vary even during banking of the motorcycle 10, thus providing improved calculation accuracy of the bank angle θ of motorcycle 10.

The first mark irradiation unit 108 and the second mark irradiation unit 110 are attached to the camera 100. This ensures high parallelism of the optical axes of the laser pointers 108*a*, 108*b*, 110*a* and 110*b* with the optical axis o of the camera 100, thus providing improved calculation accuracy of the vehicle speed v.

The camera 100 is arranged at least below the engine 28*a* or the vehicle body frame 12. As a result, the second mark irradiation unit 110 is arranged on one side of the camera 100, with the exhaust pipe 118 running on the other side of the camera 100. This prevents upsizing of the motorcycle 10 as a result of the mounting of the vehicle speed calculator 200, thus making it possible to bring the optical axis o of the camera 100 close to the center of the width of the motorcycle 10 (vehicle width centerline 10).

It should be noted that although arranged at a position offset to the left relative to the first mark irradiation unit 108 by the distance D1 in the present embodiment, the second mark irradiation unit 110 may be arranged at a position offset to the right relative to the first mark irradiation unit 108 by the distance D1. In this case, the optical axis o of the camera 100 can be brought close to the vehicle width centerline c of the motorcycle 10 by running the exhaust pipe 118 on the left side of the camera 100.

Although arranged where the optical axis o is offset to the left from the vehicle width centerline c, the camera 100 may be arranged where the optical axis o is offset to the right from the vehicle width centerline c. Of course, it is preferred that the camera 100 should be provided in such a manner that the optical axis o is aligned with the vehicle width centerline c.

Although arranged at a position offset to the left relative to the first mark irradiation unit 108 by the distance D1, the laser pointers 110*a* and 110*b* may be arranged at positions offset, one to the left and the other to the right, by the distance D1.

Although the vehicle speed calculator 200 is provided below the engine 28*a* in the present embodiment, it is acceptable as long as the vehicle speed calculator 200 is provided below the vehicle body frame 12. On the other hand, although a description has been given with reference to the motorcycle 10, the vehicle may be a three- or four-wheeled vehicle as long as it is a rocking vehicle.

Although calculating the bank angle θ by using Formulas (2) to (6) given above, the bank angle calculation unit 222 may calculate the bank angle θ by using the approach described below. In this case, the bank angle calculation unit 222 detects an offset distance (distance along the vehicle width) Y3 [pixels] (refer to FIG. 8) between the first mark 109 irradiated by the first mark irradiation unit 108 and the second mark 111 irradiated by the second mark irradiation unit 110 in the shot image. Then, the bank angle calculation unit 222 finds the bank angle θ based on the ratio of the offset distance D1 to the reference distance T1 (D1/T1) and the ratio of the offset distance Y3 to the image reference distance Y1 (Y3/Y1).

Although a description has been given of the above embodiment with reference to the engine 28*a*, it is acceptable as long as the power unit serves as a driving source of a rocking vehicle, and an electric motor may be used as a power unit. In this case, the rotary shaft adapted to rotate integrally with the rotor of the electric motor serves as a main shaft.

A description has been given above of the present invention with reference to the preferred embodiment. However, the technical scope of the present invention is not limited to the scope described in the above embodiment. It is apparent to those skilled in the art that various changes and modifications can be made to the above embodiment. It is apparent from the scope of the claims that the technical scope of the present invention also includes embodiments with such changes or modifications. On the other hand, the reference symbols in round brackets appearing in the scope of the claims have been added to imitate those given in the accompanying drawings for easy understanding of the present invention. The present invention is not to be interpreted as being limited to the elements with the reference symbols.

DESCRIPTION OF REFERENCE SYMBOLS

10 Motorcycle
12 Vehicle body frame
14 Head pipe
18 Front wheel
20 Handle
25 Swing arm pivot shaft
28 Power unit
28a Engine
28b Transmission
29 Crankshaft
30 Rear wheel
32 Swing arm
34 Step
38 Bank sensor
62 Under cowl
100 Camera
102 Stay
104 Oil pan
105 Concave recess
106 Lens barrel
108 First mark irradiation unit
108a, 108b, 110a, 110b Laser pointer
109 First mark
110 Second mark irradiation unit
111 Second mark
112, 114, 116 Opening
118 Exhaust pipe
200 Vehicle speed calculator
202 Control section
210 Camera control unit
212 Irradiation control unit
214 Traveled distance detection unit
216 Image reference distance detection unit
218 Vehicle speed calculation unit
220 Image given distance detection unit
222 Bank angle calculation unit

What is claimed is:
1. A motorcycle comprising:
a vehicle body frame,
a power unit operatively attached to the vehicle body frame and having a crankshaft,
a front wheel provided forward of the power unit,
a rear wheel provided rearward of the power unit,
a pivot shaft provided, either on the power unit or on the vehicle body frame proximate the power unit at a position more rearward than the crankshaft,
a swing arm that is pivotally supported by the pivot shaft, and that pivotally supports the rear wheel thereon at a rear portion thereof,
a single video camera facing downwardly and adapted to capture a moving image of a road surface under a lower portion of the frame, the video camera arranged below the power unit or the swing arm and in back of a central portion of the crankshaft;
at least two irradiation sources attached to the camera and configured to irradiate the road surface to form first and second irradiated marks in the moving image; and
a control unit configured to calculate at least one of a speed of the vehicle and a bank angle of the vehicle, using information from the video camera,
wherein the video camera is fastened to and supported by at least a lower portion of the power unit or a lower portion of the vehicle body frame proximate the power unit; and
wherein the speed of the vehicle is calculated based on a reference distance between the two irradiation sources and a detected distance between the first and second irradiated marks.

2. The motorcycle of claim 1, wherein the video camera is provided in front of the pivot shaft.

3. The motorcycle of claim 1, wherein the video camera is housed in an under cowl adapted to cover a lower portion of the power unit, and wherein an opening is formed in the under cowl at a position adjacent an optical axis of the video camera.

4. The motorcycle of claim 2, wherein the video camera is housed in an under cowl adapted to cover a lower portion of the power unit, and wherein an opening is formed in the under cowl at a position adjacent an optical axis of the video camera.

5. The motorcycle of claim 1, wherein the video camera is set to a view angle that ensures that no scene above the horizon is shot in the shot image even when the motorcycle banks fully.

6. The motorcycle of claim 2, wherein the video camera is set to a view angle that ensures that no scene above the horizon is shot in the shot image even when the motorcycle banks fully.

7. The motorcycle of claim 3, wherein the video camera is set to a view angle that ensures that no scene above the horizon is shot in the shot image even when the motorcycle banks fully.

8. The motorcycle of claim 1, wherein the video camera is set to a view angle that is large enough to include contact points of the rear wheel at the time of maximum banking of the motorcycle as seen from the front of the motorcycle.

9. The motorcycle of claim 2, wherein the video camera is set to a view angle that is large enough to include contact points of the rear wheel at the time of maximum banking of the motorcycle as seen from the front of the motorcycle.

10. The motorcycle of claim 3, wherein the video camera is set to a view angle that is large enough to include contact points of the rear wheel at the time of maximum banking of the motorcycle as seen from the front of the motorcycle.

11. The motorcycle of claim 5, wherein the video camera is set to a view angle that is large enough to include contact points of the rear wheel at the time of maximum banking of the motorcycle as seen from the front of the motorcycle.

12. The motorcycle of claim 1, wherein:
the power unit comprises an engine adapted to rotate together with the rotation of the crankshaft and includes, below the crankshaft, an oil pan formed in such a manner as to bulge downwardly below the crankshaft, and
the video camera is arranged in a concave recess that is provided rearward of the oil pan.

13. The motorcycle of claim 2, wherein:
the power unit comprises an engine adapted to rotate together with the rotation of the crankshaft and includes, below the crankshaft, an oil pan formed in such a manner as to bulge downwardly below the crankshaft, and
the video camera is arranged in a concave recess that is provided rearward of the oil pan.

14. The motorcycle of claim 1, wherein the video camera is fastened to and supported by a support stay having a front end attached to a lower portion of the power unit, and a rear end attached to a lower portion of the vehicle body frame proximate the power unit.

15. A motorcycle comprising:
a vehicle body frame,
a power unit operatively attached to the vehicle body frame and comprising an engine having a crankshaft,
a front wheel provided forward of the power unit,
a rear wheel provided rearward of the power unit,
a pivot shaft provided on the vehicle body frame proximate the power unit at a position rearward of the crankshaft,
a swing arm that is pivotally supported by the pivot shaft, and that pivotally supports the rear wheel thereon at a rear portion thereof,
a single video camera facing downwardly and adapted to capture a moving image of a road surface under a lower portion of the frame, the video camera arranged below the power unit;
at least two irradiation sources attached to the camera, each of the irradiation sources configured to irradiate the road surface to form an irradiated mark in a shot image; and
a control unit configured to calculate at least one of a speed of the vehicle and a bank angle of the vehicle using information from the video camera,
wherein the video camera is fastened to and supported by a support stay having a front end attached to a lower portion of the power unit, and a rear end attached to a lower portion of the vehicle body frame proximate the power unit; and
wherein the speed of the vehicle is calculated based on a reference distance between two irradiation sources and a detected distance between two irradiated marks corresponding to said irradiation sources.

16. The motorcycle of claim 15, wherein the video camera is provided in front of the pivot shaft.

17. The motorcycle of claim 15, wherein the video camera is housed in an under cowl adapted to cover a lower portion of the power unit, and wherein an opening is formed in the under cowl at a position adjacent an optical axis of the video camera.

18. The motorcycle of claim 15, wherein the video camera is set to a view angle that ensures that no scene above the horizon is shot in the shot image even when the motorcycle banks fully.

19. The motorcycle of claim 15, wherein the video camera is set to a view angle that is large enough to include contact points of the rear wheel at the time of maximum banking of the motorcycle as seen from the front of the motorcycle.

20. The motorcycle of claim 15, wherein:
the power unit comprises an engine adapted to rotate together with the rotation of the crankshaft and includes, below the crankshaft, an oil pan formed in such a manner as to bulge downwardly below the crankshaft, and
the video camera is arranged in a concave recess that is provided rearward of the oil pan.

* * * * *